(12) United States Patent
Arnold (10) Patent No.: US 6,681,573 B2
(45) Date of Patent: Jan. 27, 2004

(54) METHODS AND SYSTEMS FOR VARIABLE GEOMETRY TURBOCHARGER CONTROL

(75) Inventor: Steven Don Arnold, Ranchos Palos Verdes, CA (US)

(73) Assignee: Honeywell International INC, Morristown, NJ (US)

( * ) Notice: Subject to any disclaimer, the term of this patent is extended or adjusted under 35 U.S.C. 154(b) by 0 days.

(21) Appl. No.: 10/199,519

(22) Filed: Jul. 19, 2002

(65) Prior Publication Data

US 2003/0145591 A1 Aug. 7, 2003

Related U.S. Application Data

(63) Continuation-in-part of application No. 10/068,322, filed on Feb. 5, 2002.

(51) Int. Cl.[7] .......................... F02B 33/46; F02D 23/00
(52) U.S. Cl. ........................................................ 60/602
(58) Field of Search ............................................. 60/602

(56) References Cited

U.S. PATENT DOCUMENTS

| | | | |
|---|---|---|---|
| 6,058,707 A | 5/2000 | Bischoff | |
| 6,067,798 A | 5/2000 | Okada et al. | |
| 6,067,799 A | 5/2000 | Heinitz et al. | |
| 6,067,800 A | 5/2000 | Kolmanovsky et al. | |
| 6,089,018 A | 7/2000 | Bischoff et al. | |
| 6,134,888 A | 10/2000 | Zimmer et al. | |
| 6,134,890 A | 10/2000 | Church et al. | |
| 6,161,383 A | 12/2000 | Aschner et al. | |
| 6,161,384 A | 12/2000 | Reinbold et al. | |
| 6,233,934 B1 | 5/2001 | Church et al. | |
| 6,256,993 B1 | 7/2001 | Halimi et al. | |
| 6,269,642 B1 | 8/2001 | Arnold et al. | |
| 6,272,859 B1 * | 8/2001 | Barnes et al. | 60/602 |
| 6,314,736 B1 | 11/2001 | Daudel et al. | |
| 6,338,250 B1 | 1/2002 | Mackay | |
| 6,397,597 B1 | 6/2002 | Gartner | |
| 6,418,719 B2 * | 7/2002 | Terry et al. | 60/602 |
| 6,427,445 B1 * | 8/2002 | Isaac et al. | 60/602 |
| 6,510,691 B1 * | 1/2003 | Schmid | 60/602 |
| 6,523,345 B2 | 2/2003 | Scherngell et al. | |

FOREIGN PATENT DOCUMENTS

| | | |
|---|---|---|
| EP | 0786589 A | 7/1997 |
| WO | WO 0155575 A | 8/2001 |
| WO | WO 0159275 A | 8/2001 |
| WO | WO 0175292 A | 10/2001 |

OTHER PUBLICATIONS

U.S. patent application Ser. No. 10/068,322, Arnold, filed Feb. 5, 2002.

* cited by examiner

Primary Examiner—Sheldon J. Richter
(74) Attorney, Agent, or Firm—Ephraim Starr; Don Hill

(57) ABSTRACT

Methods and systems of this invention for positioning a variable geometry member disposed within a variable geometry turbocharger involve determining a boost pressure target for the turbocharger and comparing the same to an actual boost to calculate an error value, $err_{boost}$.

30 Claims, 5 Drawing Sheets

METHODS AND SYSTEMS FOR VARIABLE GEOMETRY TURBOCHARGER CONTROL

RELATED APPLICATIONS

The present application is a continuation-in-part of and claims the benefit of a parent United States Patent Application entitled "Control Method For Variable Geometry Turbocharger And Related System" Ser. No. 10/068,322, filed on Feb. 5, 2002, which is hereby fully incorporated by reference in the present application.

FIELD OF THE INVENTION

The present invention relates generally to the field of variable geometry turbocharger design and, more particularly, to method and system for controlling the position of a variable geometry member disposed within a variable geometry turbocharger.

BACKGROUND

Turbochargers are devices that are frequently used to increase the output of an internal combustion engine. A typical turbocharger comprises a turbine wheel coupled to a compressor impeller by a common shaft. Exhaust gas from the engine is diverted into a turbine housing of the turbocharger and through an inlet nozzle. The exhaust gas is directed onto the turbine wheel, causing it to spin, which in turn spins the common shaft and the compressor impeller.

The compressor impeller is disposed within a compressor housing having an air inlet and a pressurized or boosted air outlet. The spinning compressor impeller operates to pressurize air entering the compressor housing and generate a pressurized or boosted air stream that is directed into an inlet system of the internal combustion engine. This boosted air is mixed with fuel to provide a combustible mixture within the combustion chambers of an engine. In this manner, the turbocharger operates to provide a larger air mass and fuel mixture, than otherwise provided via an ambient pressure air intake stream, that results in a greater engine output during combustion.

The gain in engine output that can be achieved is directly proportional to the increase in intake air flow pressure generated by the turbocharger. However, allowing the boost pressure to reach too high a level can result in severe damage to both the turbocharger and the engine, particularly when the engine has to operate beyond its intended performance range.

Thus, an objective of turbocharger design is to regulate or control the boost pressure provided by the turbocharger in a manner that optimizes engine power output at different engine operating conditions without causing engine damage. A known technique for regulating boost pressure is by using a turbocharger having a variable geometry member that functions to control the amount of exhaust gas directed to the turbine wheel. Turbochargers comprising such variable geometry members are referred to as variable geometry turbochargers (VGTs).

One type of VGT includes a variable geometry member in the form of multiple adjustable-position vanes that are positioned within the turbine housing, and that are movable within an inlet nozzle of the turbine housing to regulate the amount of exhaust gas that is passed to the turbine wheel. The vanes in this type of VGT can be opened to permit greater gas flow across the turbine wheel, causing the turbine wheel to spin at a higher speed and raise the boost pressure, or closed to restrict exhaust gas flow to the turbine, thereby reducing the boost pressure. Thus, the amount of boost pressure generated by this type of VGT can be regulated by varying the vane position so as to optimize engine output while avoiding engine damage.

However, it is important for purposes of obtaining the desired result from the VGT and the desired output from the engine that the variable geometry member, in this or any type of VGT, be operated in a manner that will produce the desired change. Since this operation is taking place in a dynamic system of changing VGT and engine operating parameters, it is desired that a control system be used for the purpose of taking these dynamic operating conditions into account so as to provide the desired result.

It is, therefore, desired that a control system be devised that is capable of being used with a VGT to effect a desired change in the variable geometry member disposed therein for the purpose of achieving a desired VGT and engine output.

SUMMARY OF THE INVENTION

The present invention discloses methods and systems for variable geometry turbocharger (VGT) control. In one embodiment of the invention, a boost target for the turbocharger is determined from a boost target map, for example. The boost target is then compared to the actual boost to calculate an error value, $err_{boost}$, between the boost target and the actual boost. Based on $err_{boost}$, a first new VGT variable geometry member, e.g., vane, position is determined by way of a conventional proportional integral differential (PID) technique, for example.

Alternatively, the first new variable geometry member position can be generated using a modified PID technique, whereby a change in variable geometry member position is calculated according to the equation, $\Delta^\theta = k_p(err_{boost}) + k_d \cdot d(err_{boost})/dt$, where $\Delta^\theta$ is the change in variable geometry member position, $k_p$ is a proportional gain value, $k_d$ is a differential gain value, and $err_{boost}$ is the error value between the boost target and the actual boost. Following, $\Delta^\theta$ is summed with the preceding variable geometry member position to determine the first new variable geometry member position. The first new variable geometry member position may be modified by a feed forward value, FF, set as a function of the absolute value of change in fuel rate or throttle position, a threshold value, and a constant. A second new variable geometry member position may also be generated as a function of the engine speed of the engine. The variable geometry member of the VGT is then positioned by an actuator to the first new variable geometry member position if the engine is in a power mode, and to the second new variable geometry member position if the engine is in a braking mode.

In another embodiment of the invention, a boost target for the VGT is determined from a boost target map. The boost target is then compared to the actual boost to calculate a first error value, $err_{boost}$, between the boost target and the actual boost. Based on $err_{boost}$, a turbo speed target is determined by way of a conventional PID technique, for example. A second error value, $err_{boost}$, is then calculated between the turbo speed target and the actual turbo speed of the turbocharger. The $err_{boost}$ may then be inputted into a PID module to determine a new variable geometry member position for the turbocharger using a conventional PID technique. In certain embodiments, the turbo speed target and the new variable geometry member position may be generated using a modified PID technique. For example, the turbo speed target can be generated by first determining a change in turbo speed, $\Delta_{speed}$, where $\Delta_{speed}$ is substantially equal to $k_p(\text{err}_{boost})+k_d \cdot d(\text{err}_{boost})/dt$, and then summing $\Delta_{speed}$ with the actual turbo speed. The new variable geometry member position, meantime, may be generated by first calculating a change in variable geometry member position, $\Delta^\theta$, where $\Delta^\theta$ is substantially equal to $k_p(\text{err}_{speed})+k_d \cdot d(\text{err}_{boost})/dt$, and then summing $\Delta^\theta$ with a preceding variable geometry member position. An actuator may then be used to position the variable geometry member of the turbocharger according to the new variable geometry member position.

In yet another embodiment of the invention, a boost target for the VGT is determined, and an error value, $\text{err}_{boost}$, between the boost target and the actual boost is calculated. A first turbo speed target, based on $\text{err}_{boost}$, is then generated using, for example, a conventional PID technique. Additionally, a turbine pressure target for the turbocharger is determined from a turbine pressure map. The turbine pressure target is then compared to the actual turbine pressure in order calculate a second error value, $\text{err}_{turbine}$, which is then used to generate a second turbo speed target. As an example, the second turbo speed target can be generated using a conventional PID technique. Following, if the engine is in power mode, then the first turbo speed target is selected for use is determining a new variable geometry member position. However, if the engine is in braking mode, then the second turbo speed target is the selected turbo speed target. Depending on the mode of the engine, the selected turbo speed target is then compared to the actual turbo speed to calculate a third error value, $\text{err}_{speed}$, which is used to determine a new variable geometry position for the turbocharger.

In certain aspects of the present embodiment, rather than using conventional PID techniques, the first and second turbo speed target and the new variable geometry member position can be generated using a modified PID technique. For instance, the change in turbo speed needed to achieve the first turbo speed target may first be determined and then summed with the actual turbo speed to generate the first turbo speed target, wherein the change in turbo speed, $\Delta_{speed}$, is substantially equal to $k_p(\text{err}_{boost})+k_d \cdot d(\text{err}_{boost})/dt$. In a parallel manner, the second turbo speed target can be generated by adding the change in turbo speed, $\Delta_{speed}$, to the actual turbo speed, where $\Delta_{speed}$ is substantially equal to $k_p(\text{err}_{turbine})+k_d \cdot d(\text{err}_{turbine})/dt$. The new variable geometry member position, meantime, may be generated by first calculating the change in variable geometry member position, $\Delta^\theta$, and then summing $\Delta^\theta$ with the variable geometry member position of the preceding iteration, where $\Delta^\theta$ is substantially equal to $k_p(\text{err}_{speed})+k_d \cdot d(\text{err}_{speed})/dt$.

DETAILED DESCRIPTION OF THE INVENTION

Control systems, constructed according to principles of this invention, for variable geometry turbochargers (VGTs) are specifically designed to govern the flow of exhaust gas to a turbine wheel in the turbocharger, thereby controlling pressurized air output by the turbocharger.

Figure 1:
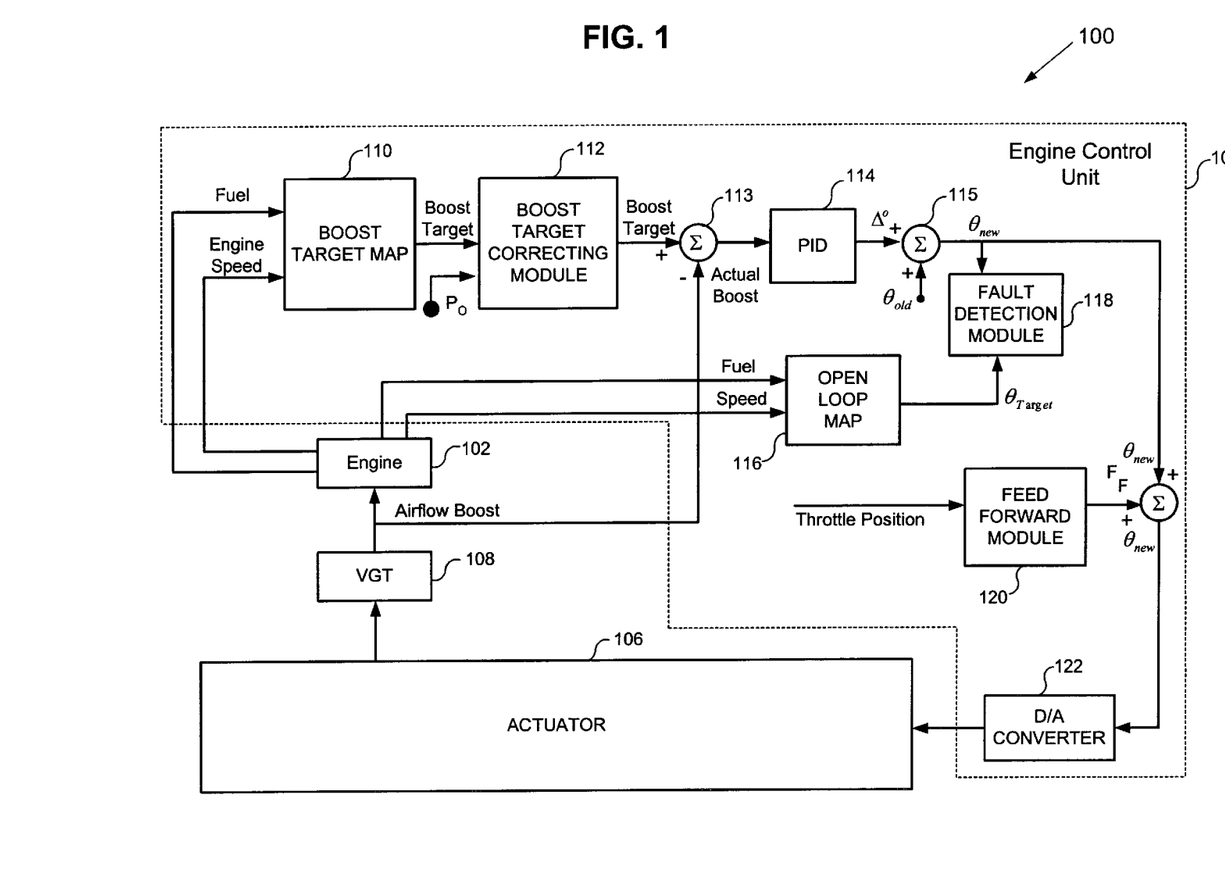
FIG. 1 illustrates a block diagram of a control system embodiment according to principles of this invention for use with a variable geometry turbocharger.

FIG. 1 illustrates a turbocharged internal combustion engine system 100 comprising a control system according to one embodiment of this invention The engine system comprises an internal combustion engine 102, and engine control unit (ECU) 104, and actuator 106, and a VGT 108 in air and exhaust flow communication with the engine. The VGT includes one or more variable geometry members that are movably disposed therein, and that are coupled to the actuator for movement/position control.

The ECU 104 can include a boost target map 110, a boost target correcting module 112, a proportional/integral/differential (PID) module 114, an open loop map 116, a fault detection module 118, a feed forward module 120, and a digital/analog (D/A) converter 122. The VGT 108 can be include a variable geometry member in the form of a number of aerodynamic vanes that are movably attached to an inlet nozzle of the VGT turbine, and that are positioned upstream from a turbine wheel disposed within the housing. An example VGT of this type is disclosed in U.S. Pat. No. 6,269,642, which is incorporated herein by reference. The position of the vanes in the VGT 108 is controlled by the actuator 106, which can be configured to pivot the vanes in unison incrementally to control the throat area of the inlet nozzle, and thereby, control the amount of exhaust gas that flows into the VGT 108.

The actuator 106 can be one of suitable design known in the art, for example, a position-dependent actuator design. A suitable actuator design is disclosed in U.S. Pat. No. 6,269,642. Alternatively, the actuator 106 can be an electrical actuator with position feedback configured to communicate with the ECU 104 as part of a controller area network (CAN), which is a communication standard frequently used for in-vehicle control.

According to the present embodiment, sensors can be used to measure the quantity of fuel flow to engine 102, as well as the engine speed of engine 102, in a manner known in the art. It is noted that fuel quantity and engine speed are also referred to as "engine parameters" in the present application. The fuel quantity and engine speed measured by the sensors are fed into the boost target map 110. The boost target map 110 can be a map stored in a memory component of the ECU 104, for example, containing desired boost pressure data for a given fuel quantity or engine speed. Based on the fuel quantity or engine speed, a boost target is determined from boost target map 110. In one embodiment, braking status of the vehicle can also be factored into the determination of the boost target.

The boost target is input into the boost target correcting module 112, which also receives input from sensors that measure the ambient pressure, $P_o$. One function of the boost target correcting module 112 is to prevent the VGT 108 from overspeeding in instances where the ambient pressure is relatively low, such that meeting the boost target would overspeed the turbocharger. For example, the boost target correcting module 112 can determine a maximum permissible boost as a function of the ambient pressure, the engine speed, and the turbocharger speed limit. If the boost target that is determined from the boost target map 110 exceeds the maximum permissible boost, then the boost target correcting module 112 can reduce the boost target to a permissible level. In this manner, the boost target correcting module 112 can be configured to adjust the boost target in instances where the boost target could result in overspeeding the turbocharger.

The corrected boost target generated by the boost target correcting module 112 is then compared to the actual boost at summing node 113 to determine the error between the boost target and the actual boost. The error value, which is also referred to as "err" in the present application, is fed into the PID module 114. The PID module 114 can be configured to determine a new variable geometry member, e.g., vane position, $\theta_{new}$, to achieve the boost target utilizing a suitable PID filtering method known in the art.

In one embodiment, rather than determining $\theta_{new}$ directly, the PID module 114 can be configured to calculate the change in vane position, i.e., $\Delta^\theta$, needed in order to meet the boost target. For example, the PID module 114 can be configured to calculate $\Delta^\theta$ according to Equation 1, below:

$$\Delta^\theta = k_p(err) + k_d \cdot d(err)/dt \qquad \text{Equation 1}$$

wherein "err" is the error value defined as the difference between the actual boost and the boost target as determined at summing node 113, and wherein $k_p$ is the proportional gain value and $k_d$ is the differential gain value determined in a manner known in the art. A new vane position, i.e. $\theta_{new}$, is then determined by summing $\Delta^\theta$ and $\theta_{old}$ at the summing node 115. Once $\theta_{new}$ has been determined, other corrective/diagnostic mechanisms can be utilized to enhance the level of control. In one embodiment, an open loop diagnostic mechanism can be implemented wherein a target vane position, $\theta_{target}$, is determined from an open loop map 116.

The open loop map 116 can be, for example, a map stored in a memory component in the ECU 104 that, based only on fuel quantity and engine speed, plots a desired vane position for different fuel quantities and engine speeds. $\theta_{new}$ and $\theta_{target}$ can then be inputted into a fault detection module 118, which can be configured to determine the difference in value between $\theta_{new}$ and $\theta_{target}$ to generate $\theta_{diff}$. The Fault detection module 118 can be further configured to compare $\theta_{diff}$ against a threshold fault value. If the fault detection module 118 determines that $\theta_{diff}$ is equal to, or exceeds, the threshold fault value, for example, then the fault detection module 118 can send an error message to a control module (not shown) in the ECU 104 signaling the ECU 104 to enter a fault mode.

In one embodiment, a feed forward mechanism can also be implemented subsequent to the determination of $\theta_{new}$. The feed forward module 120, which receives data on throttle position and/or fuel rate from engine 102, can be configured to determine the feed-forward value ("FF") as a function of the absolute value of the change in throttle position ("TP"), a threshold value ("Y") and a constant value ("$K_a$") according to Equation 2, below:

$$FF = (|dTP/dt| - Y)^* K_a \qquad \text{Equation 2}$$

Alternatively, the feed forward value can be determined from the absolute value of the change in fuel rate, rather than throttle position. The feed forward value generated by the feed forward module 120 may then be summed with $\theta_{new}$ to modify $\theta_{new}$. In this manner, i.e., by taking into account throttle position and/or fuel rate to complement the error-based determination of $\theta_{new}$ by the PID module 114, the feed forward module 120 operates to provide numerous advantages, including a reduction in turbo lag.

$\theta_{new}$ is fed into a D/A converter 122, which can be configured to convert $\theta_{new}$ into an analog signal. In one embodiment, the D/A converter 122 is a voltage driver configured to convert $\theta_{new}$ into a pulse code modulation ("PWM") signal. Alternatively, the D/A converter 122 can be a current driver configured to convert $\theta_{new}$ into a dithered current. The signal from the D/A converter 122 is then used to control the position of the actuator 106.

In response to the signal from the D/A converter 122, the actuator 106 adjusts the vane position of the VGT 108 to match $\theta_{new}$. In this manner, the vane position of the VGT 108 can be controlled and adjusted, thereby regulating the flow of exhaust gas into the VGT 108, and thereby controlling the level of boost pressure generated by the VGT 108.

Figure 2:
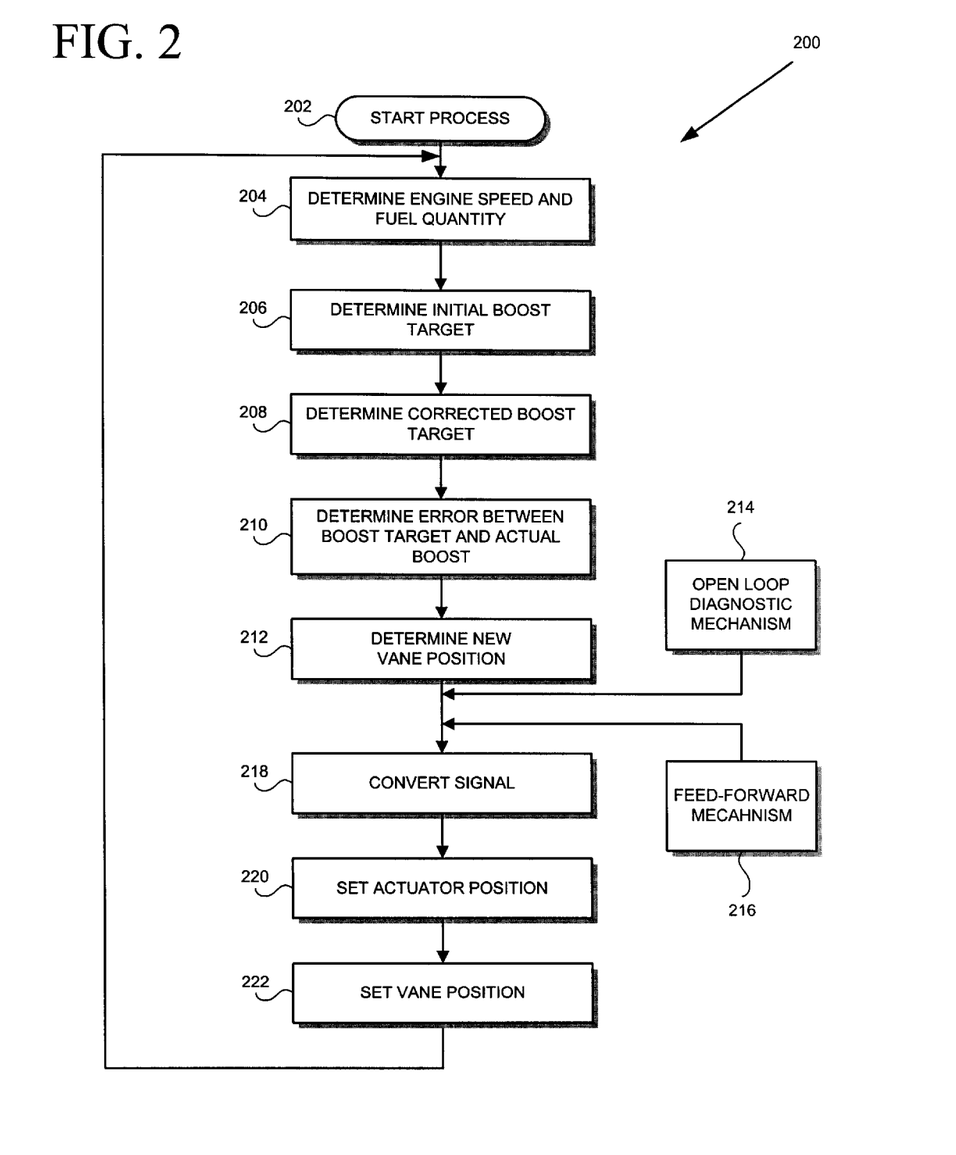
FIG. 2 is a flowchart of a control system method according to principles of this invention for use with a variable geometry turbocharger.

FIG. 2 illustrates an exemplary VGT control system method 200 according to one embodiment of this invention, wherein the variable geometry member of the VGT is adjusted. It is noted that control method 200 can be implemented in an engine system such as the engine system 100 in FIG. 1.

The control method 200 begins at step 202 and proceeds to step 204, where the engine speed and/or fuel quantity are measured. The engine speed and fuel quantity can be measured using a suitable measurement means known in the art, for example, by way of a sensor. The measured engine speed and fuel quantity are input into an ECU, which can use either the engine speed or fuel quantity to determine a desired vane position for a VGT coupled to the engine.

Next, at step 206 of the control method 200, the measured engine speed and/or fuel quantity are used to determine a boost target for the VGT. The boost target can be determined, for example, from a boost target map stored in a memory component in the ECU containing desired boost levels for different engine speeds and fuel quantities. Subsequently, the boost target can be corrected, if necessary, at step 208 if it is determined that realizing the boost target would result in overspeeding the turbocharger. In such instance, the boost target may be reduced to avoid overspeeding the turbocharger.

After the boost target has been corrected, if necessary, at step 208, the VGT control method 200 continues to step 210, where the error value, or "err," between the boost target and the actual boost is determined. The error value from step 210 is then used in step 212 to determine a new vane position, $\theta_{new}$, for the VGT. The new vane position can be determined by using a suitable PID filter known in the art. Alternatively, $\theta_{new}$ can be determined by first calculating the change in vane position, i.e. $\Delta^\theta$, needed to realize the boost target. In one embodiment, $\Delta^\theta$ is determined according to equation 1, below:

$$\Delta^\theta = k_p(err) + k_d \cdot d(err)/dt \qquad \text{Equation 1}$$

wherein $k_p$ is a proportional gain value and $k_d$ is the differential gain value determined in a manner known in the art. Once $\Delta^\theta$ has been calculated, $\theta_{new}$ can then be determined by summing $\Delta^\theta$ with the old vane position.

Following the determination of $\theta_{new}$ at step 212, in one embodiment, the control method 200 includes step 214, where an open loop diagnostic mechanism is applied. At step 214, a target vane position, $\theta_{target}$, can be determined from an open loop map stored in a memory component in the ECU. The map can plot desired vane positions based only on fuel quantity and engine speed. The difference between $\theta_{new}$ and $\theta_{target}$ is then compared against a threshold fault value. If the difference between $\theta_{new}$ and $\theta_{target}$ is equal to, or exceeds, the threshold fault value, then an error message can be generated, for example, and the system can be triggered to enter a fault mode.

In one embodiment, following the determination of $\theta_{new}$ at step 212, a feed-forward mechanism is applied at step 216.

At step 216, a feed forward value, FF, can be calculated according to Equation 2, below:

$$FF=(|dTP/dt|-Y)*K_a \qquad \text{Equation 2}$$

wherein TP is the throttle position, Y is a threshold value and $K_a$ is a constant. In one embodiment, a fuel quantity measurement can be used in place of throttle position in Equation 2 to calculate FF.

Next, at step 218, the signal representing the new vane position is converted to an analog signal. The signal can be converted, for example, by either a voltage driver or a current driver. The converted signal is then used at step 220 to set the actuator position, which in turn sets the vane position of the VGT at step 222. The vane position is set so as to achieve the boost target determined in earlier steps. The control method 200 then returns to step 204 where the engine speed and fuel quantity are again measured, and the control loop can be repeated. In this manner, the geometry of the VGT, and more particularly the vane position of the VGT, can be controlled.

Figure 3:
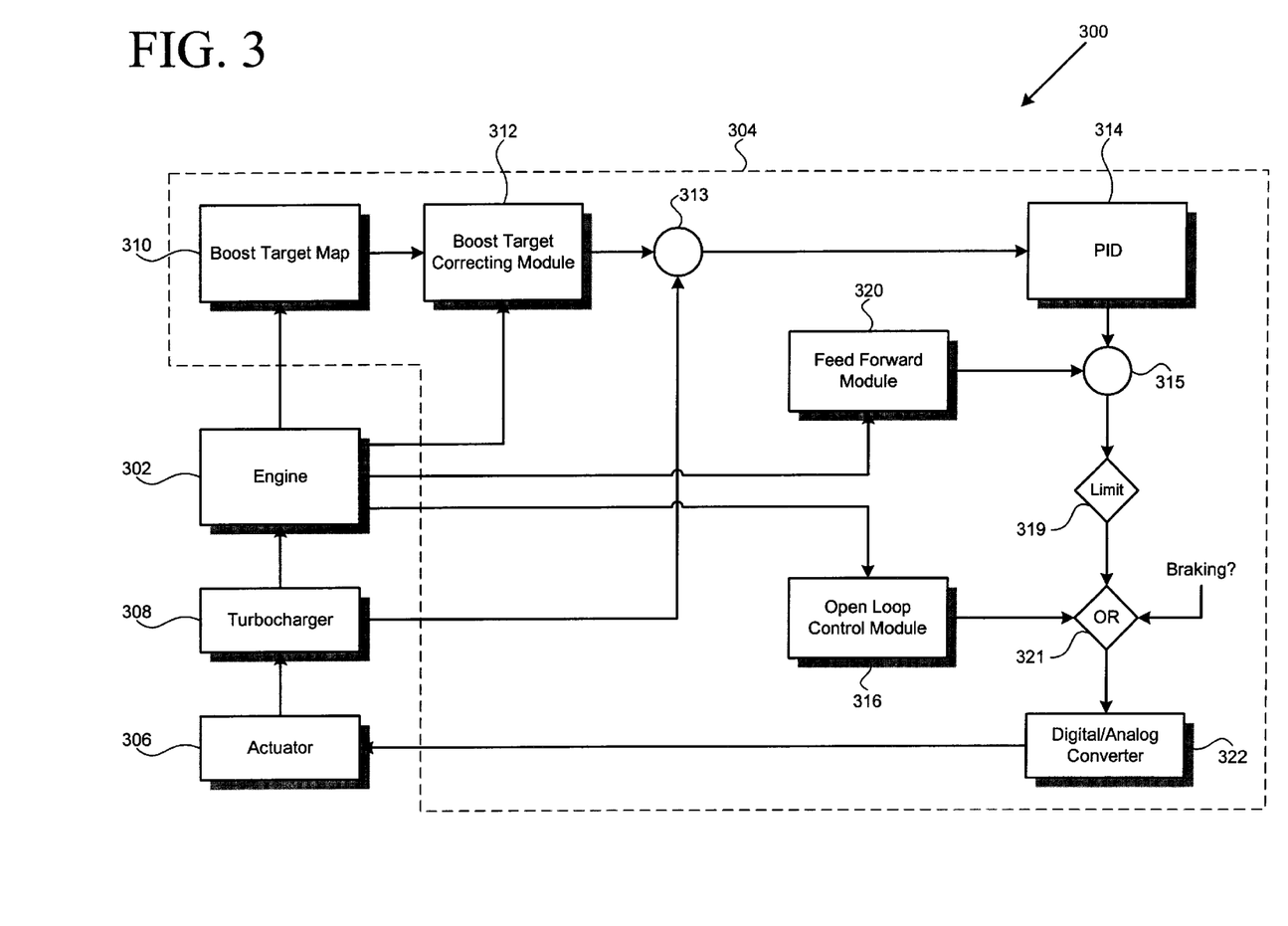
FIG. 3 illustrates a block diagram of a control system embodiment according to principles of this invention for use with a variable geometry turbocharger.

In certain embodiments, additional control mechanisms can be implemented that take into consideration other factors, such as vehicle braking, in determining a new vane position for the turbocharger. Reference is now made to FIG. 3 illustrating exemplary engine system 300 according to one embodiment of the invention, in which embodiment an open loop engine braking control mechanism is implemented to enhance vane position control. It is noted that the engine 302, VGT 308, actuator 306, and D/A converter 322 of the engine system 300 are respectively equivalent to the engine 102, VGT 108, actuator 106, and D/A converter 122 of the engine system 100 illustrated in FIG. 1. As shown, the engine system 300 further includes an ECU 304.

According to the present embodiment, sensors can be used to measure the quantity of fuel flow to the engine 302, as well as the engine speed of the engine 302. The fuel rate and/or engine speed measured by the sensors are fed into the boost target map 310. The boost target map 310 can be a file stored in a memory component of the ECU 304, for example, mapping desired boost pressure for a given fuel rate or engine speed. Based on the fuel rate or engine speed, a boost target is determined from the boost target map 310.

The boost target is input into a boost target correcting module 312, which also receives input from sensors on the engine 302 measuring the ambient pressure, $P_o$. One function of the boost target correcting module 312 is to prevent the VGT 308 from overspeeding in instances where the ambient pressure is relatively low, such that meeting the boost target would overspeed the turbocharger. For example, a maximum permissible boost can be defined as a function of the ambient pressure, the engine speed, and the VGT turbine speed limit. If the boost target determined from the boost target map 310 exceeds the maximum permissible boost, then the boost target correcting module 312 can operate to reduce the boost target to a permissible level. In this manner, the boost target correcting module 312 adjusts the boost target in instances where the boost target derived from the boost target map 310 would result in overspeeding the VGT.

The corrected boost target generated by the boost target correcting module 312 is then compared to the actual boost at a summing node 313 to determine the error between the boost target and the actual boost. The error value, which is also referred to as "err" in the present application, is fed into a PID module 314. The PID module 314 can be configured to determine a new vane position, $\theta_{new}$, for the VGT 308 needed to achieve the boost target utilizing a suitable proportional gain, integral gain, and differential gain filtering technique ("PID technique"). In one embodiment, rather than determining $\theta_{new}$ directly by means of a conventional PID technique, the PID module 314 can be configured to calculate the change in vane position, i.e., $\Delta^\theta$, needed in order to meet the boost target. For example, the PID module 314 can be configured to calculate $\Delta^\theta$ according to Equation 3, below:

$$\Delta^\theta = k_p(err_{boost}) + k_d \cdot d(err_{boost})/dt \qquad \text{Equation 3}$$

wherein "$err_{boost}$" is the error value defined as the difference between the actual boost and the boost target as determined at summing node 313, and wherein $k_p$ is the proportional gain value and $k_d$ is the differential gain value. A new vane position, i.e. $\theta_{new}$, may then be determined by summing $\Delta^\theta$ with the vane position from the preceding iteration at summing node 315.

In one embodiment, a feed forward mechanism can also be implemented subsequent to the determination of $\theta_{new}$. A feed forward module 320, which receives data on throttle position and/or fuel rate from engine 302, can be configured to determine a feed forward value ("FF") as a function of the absolute value of the change in throttle position ("TP"), a threshold value ("Y") and a constant value ("$K_a$") according to Equation 2, discussed above, and shown below:

$$FF=(|dTP/dt|-Y)*K_a \qquad \text{Equation 2}$$

Alternatively, the feed forward value can be determined from the absolute value of the change in fuel rate, rather than throttle position. The feed forward value generated by the feed forward module 320 may then be summed with $\theta_{new}$ at summing node 315 to modify $\theta_{new}$. In this manner, i.e., by taking into account throttle position and/or fuel rate to complement the error-based determination of $\theta_{new}$ by PID module 314, the feed forward module 320 provides numerous advantages, including a reduction in turbo lag.

In certain embodiments, a decision block, such as a limiting block 319, may be implemented to ensure that $\theta_{new}$ is within a desired or acceptable range. At limiting block 319, $\theta_{new}$ can be compared to a maximum and a minimum vane position. If $\theta_{new}$ exceeds either threshold position, then $\theta_{new}$ can be altered at limiting block 319 to bring $\theta_{new}$ within the maximum and minimum vane position settings. For example, if $\theta_{new}$ exceeds the maximum vane position, then $\theta_{new}$ would be reset to the maximum vane position threshold. Following, $\theta_{new}$ is fed into the decision block 321.

Continuing with FIG. 3, the ECU 304 further comprises an open-loop control module 316, which receives input from sensors measuring the engine 302 speed. The open-loop control module 316 can be configured to generate an open-loop vane position target as a function of the engine speed. A suitable map stored in a memory component and mapping vane position as a function of the engine speed may be used to derive the vane position target. The open-loop vane position target generated by open loop control module 316 is then fed into decision block 321.

At decision block 321, the ECU 304 determines whether engine 302 is in braking or non-braking, i.e., "power", mode. If the engine 302 is in power mode, then $\theta_{new}$ is the preferred vane position target for the current iteration and is not altered. However, in instances where engine 302 is in braking mode, the open-loop vane position target generated by open loop control module 316 is preferred. In such case, $\theta_{new}$ would assume the open loop vane position target generated by the open loop control module 316.

Following, $\theta_{new}$ is fed into a D/A converter 322, which can be configured to convert $\theta_{new}$ into an analog signal. In one embodiment, the D/A converter 322 is a voltage driver configured to convert $\theta_{new}$ into a pulse code modulation ("PWM") signal. Alternatively, the D/A converter 322 can be a current driver configured to convert $\theta_{new}$ into a dithered current. The signal from the D/A converter 322 is then used to control the position of the actuator 306. In response to the signal from the D/A converter 322, the actuator 306 adjusts the vane position of the VGT 308 to match $\theta_{new}$.

Figure 4:
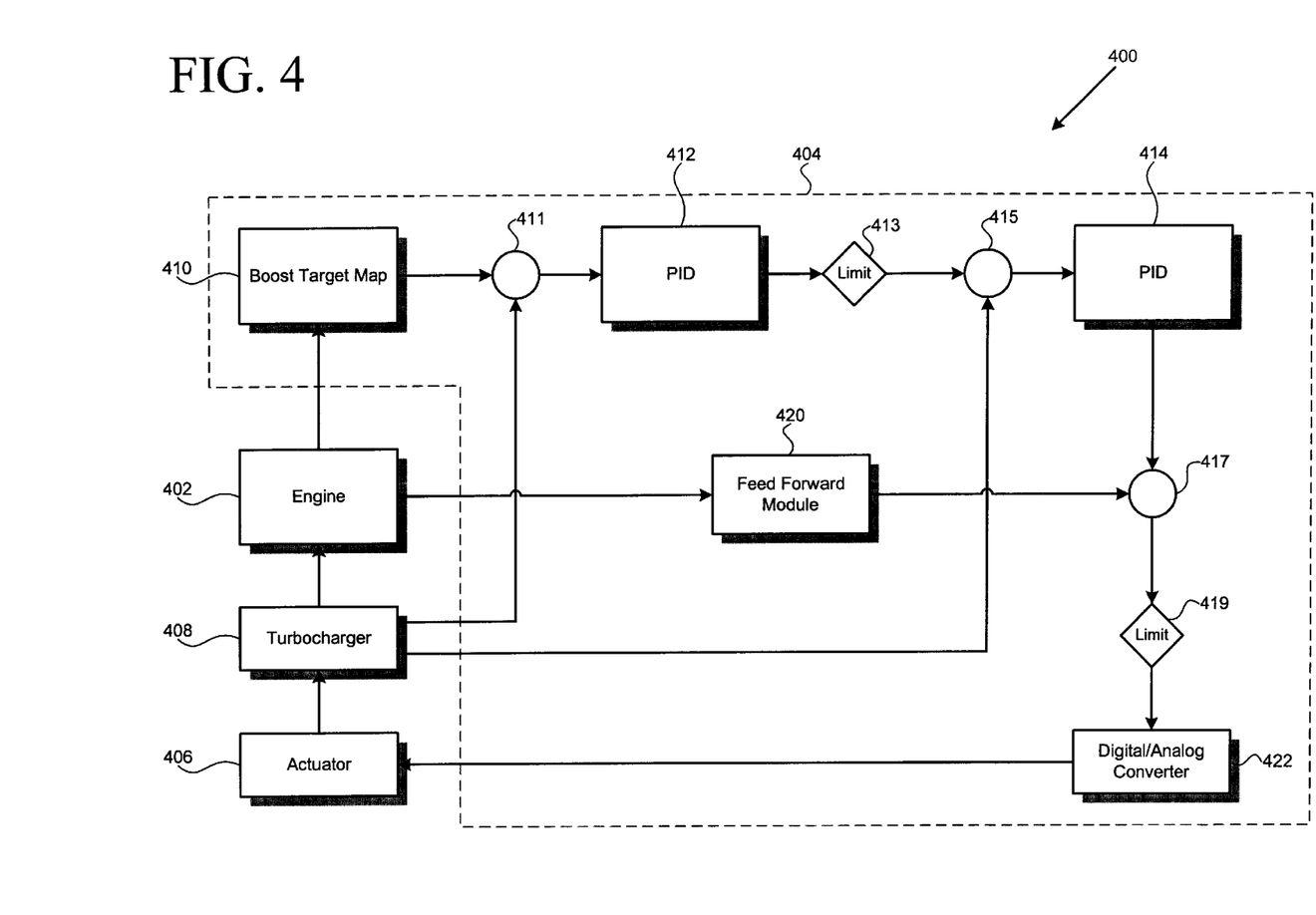
FIG. 4 illustrates a block diagram of a control system embodiment according to principles of this invention for use with a variable geometry turbocharger.

Reference is now made to FIG. 4, which illustrates an exemplary engine system 400 according to one embodiment of the invention, according to which a cascaded PID technique is implemented to control the speed of the turbocharger as a means for managing vane position. It is noted that the engine 402, VGT 408, actuator 406, and D/A converter 422 of engine system 400 are respectively equivalent to the engine 102, VGT 108, actuator 106, and D/A converter 122 illustrated in FIG. 1.

As shown, the engine system 400 also comprises a ECU 404. A boost target map 410 of the ECU 404 receives input from the engine 402 indicating the engine speed and/or fuel rate of the engine 402. Based on the fuel rate or engine speed of the engine 402, a boost target is derived from the boost target map 410. The boost target is then compared to the actual boost of the VGT 408 at summing node 411 in order to determine a boost error.

The boost error is then input into a PID 412, which may utilize any suitable PID technique known in the art to determine a turbo speed target. In certain embodiments, the PID 412 may be configured to produce the turbo speed target using a modified PID approach. According to the modified PID approach, a change in the speed of the turbo, i.e., $\Delta_{speed}$, needed to achieve the boost target is first calculated and then summed with the actual turbo speed in order to arrive at a turbo speed target. In such embodiments, delta turbo speed may be calculated according to Equation 4, as follows:

$$\Delta_{speed} = k_p(err_{boost}) + k_d \cdot d(err_{boost})/dt \qquad \text{Equation 4}$$

wherein "$err_{boost}$" is an error value defined as the difference between the actual boost and the boost target as determined at the summing node 411, and wherein $k_p$ is the proportional gain value and $k_d$ is the differential gain value. Once $\Delta_{speed}$ has been determined, then the turbo speed limit may be calculated by summing $\Delta_{speed}$ with the actual turbo speed.

A limiting block 413 may next be implemented to limit the turbo speed target to within a desired range. Lower and upper turbo speed limits may be set for the system in order to enhance performance while minimizing stress to the system. Thus, if the turbo speed target determined by the PID 412 falls outside the desired range, the turbo speed target can be reset to with the desired range at the limiting block 413.

After the turbo speed target has been determined, it is compared to the actual turbo speed at the summing node 415. The difference between the turbo speed target and the actual turbo speed, which is defined as the turbo speed error, or "$err_{speed}$," is then fed into a PID 414. The PID 414 may be configured to determine a new vane position (i.e., $\theta_{new}$) based on $err_{speed}$ and a known PID technique. Alternatively, the PID 414 may determine $\theta_{new}$ by first utilizing a modified PID to calculate a desired change in vane position, i.e. $\Delta^\theta$, according to Equation 5, below:

$$\Delta^\theta = k_p(err_{speed}) + k_d \cdot d(err_{speed})/dt \qquad \text{Equation 5}$$

wherein "$err_{speed}$" is the difference between the actual turbo speed and the turbo speed target as determined at a summing node 415, and wherein $k_p$ is the proportional gain value and $k_d$ is the differential gain value. Following, $\Delta^\theta$ is summed with the vane position from the preceding iteration to arrive at $\theta_{new}$, which is then inputted into summing node 417.

As shown in FIG. 4, certain embodiments of the engine system 400 may also include a feed forward module 420, which is equivalent to the feed forward module 120 of engine system 100 in FIG. 1. Accordingly, the feed forward module 420 receives input from sensors on the engine 402 indicating the throttle position and/or fuel rate of the engine 402. Based on the input throttle position or fuel rate, a threshold value ("Y") and a constant value ("$K_a$"), the feed forward module 420 generates a feed forward value that is fed into the summing node 417 in order to modify $\theta_{new}$ as needed. The feed forward value can be calculated according to Equation 2, described above.

Next, a limiting block 419 may be implemented as a safeguard to keep $\theta_{new}$ within a desired range. An upper and lower vane position can be defined, and in instances where $\theta_{new}$ is outside these parameters, then $\theta_{new}$ can be reset to be within the upper and lower thresholds. Following, $\theta_{new}$ is fed into a D/A converter 422, which converts $\theta_{new}$ into an analog signal for the controlling actuator 406. In response to the signal from the D/A converter 422, the actuator 406 adjusts the vane position of the VGT 408 to match $\theta_{new}$. In this manner, the vane position of the VGT 408 can be controlled and adjusted.

Figure 5:
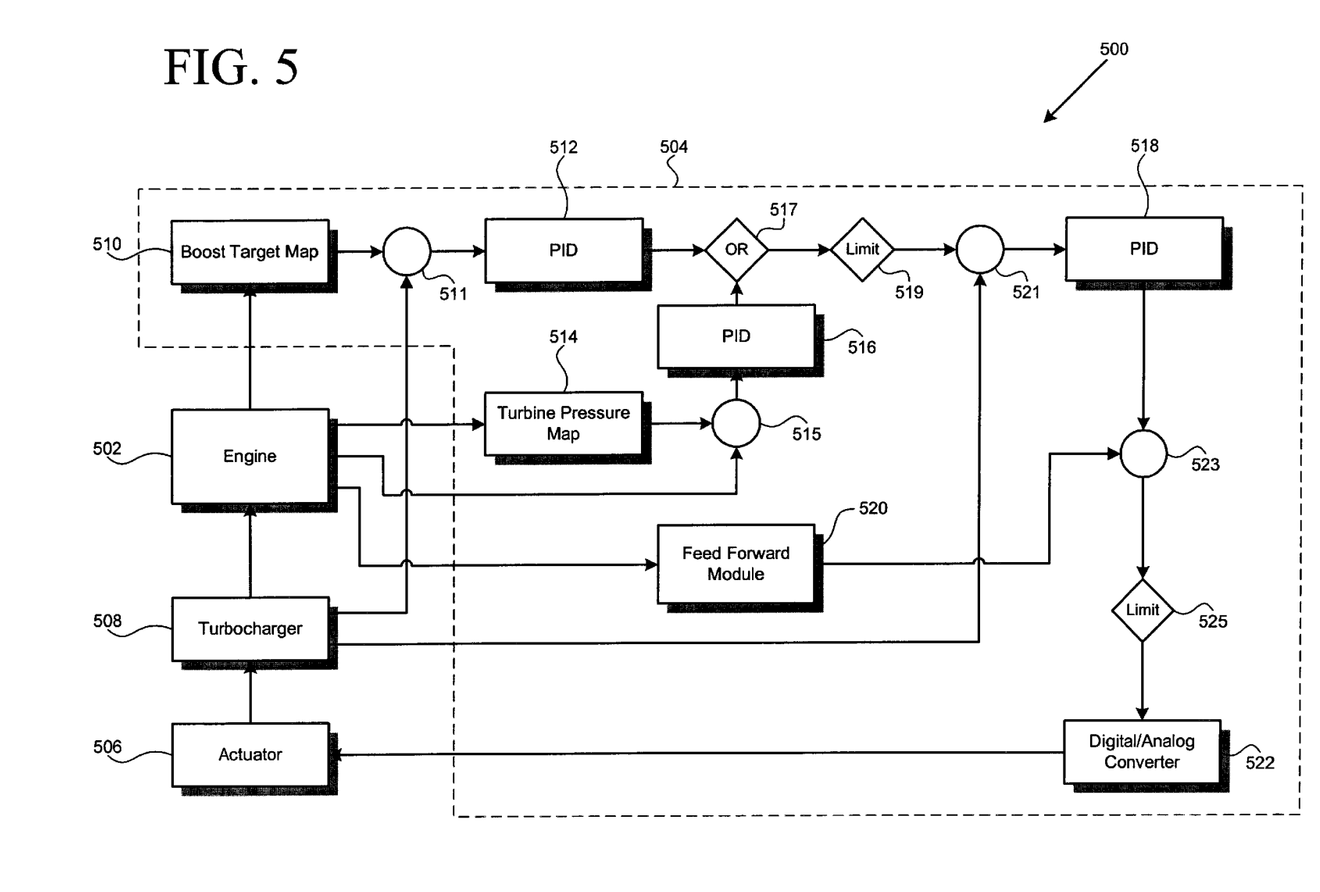
FIG. 5 illustrates a block diagram of a control system embodiment according to principles of this invention for use with a variable geometry turbocharger.

Reference is now made to FIG. 5, which illustrates an engine system 500 in accordance with one embodiment, according to which a closed loop engine braking control based on turbine pressure, combined with a cascaded PID technique, is utilized to manage vane position. It is noted that the engine 502, VGT 508, actuator 506, and D/A converter 522 of the engine system 500 are respectively equivalent to the engine 102, VGT 108, actuator 106, and D/A converter 122 of the system 100 illustrated in FIG. 1.

In the present embodiment, an ECU 504 first determines a turbo speed target for the VGT 508 according to two methods. According to the first method, a boost target map 510 determines a boost target based on the engine speed and fuel rate of the engine 502. The boost target is then compared to the actual boost of the VGT 508 at a summing node 511 to derive the boost error. Next, the boost error is input into a PID 512, which can utilize a conventional PID technique to generate a turbo speed target based on the boost error. Alternatively, the PID 512 may be configured to generate the turbo speed target using a modified PID technique, whereby a desired change in turbo speed, i.e., $\Delta_{speed}$, is calculated and summed with the actual turbo speed to produce the turbo speed target. Equation 4, which is described above, may be used to calculate $\Delta_{speed}$, as shown below:

$$\Delta_{speed} = k_p(err_{boost}) + k_d(err_{boost})/dt \qquad \text{Equation 4}$$

wherein "$err_{boost}$" is the error value defined as the difference between the actual boost and the boost target, and wherein $k_p$ is the proportional gain value and $k_d$ is the differential gain value. Once $\Delta_{speed}$ has been determined, the turbo speed target may be calculated by summing $\Delta_{speed}$ with the actual turbo speed.

In the second method for determining a turbo speed target, the engine speed of the engine 502 is fed into a turbine pressure map 514. The turbine pressure map 514 can be a file stored in a memory component of the ECU 504, for example, mapping desired turbine pressures for a given engine speeds. Based on the input engine speed, a turbine pressure target is determined from the turbine pressure map 514. The turbine pressure target is then compared to the actual turbine pressure, as measured by sensors on the engine 502. The turbine pressure error, which is referred to as the difference between the turbine pressure target and the actual turbine pressure, is determined by comparing the turbine pressure target and the actual turbine pressure at summing node 515. The turbine pressure error is then input into a PID 516, which can generate a turbo speed target utilizing a conventional PID technique. Alternatively, a modified PID technique may instead be used to arrive at the turbo speed target by first determining a desired change in turbo speed, or $\Delta_{speed}$, and then adding the $\Delta_{speed}$ to the actual turbo speed. $\Delta_{speed}$ may be calculated according to Equation 6, below:

$$\Delta_{turbine} = k_p(err_{turbine}) + k_d \cdot d(err_{turbine})/dt \qquad \text{Equation 6}$$

wherein "$err_{turbine}$" is the error value defined as the difference between the actual turbine pressure and the turbine pressure target, and wherein $k_p$ is the proportional gain value and $k_d$ is the differential gain value. Summing $\Delta_{speed}$ with the actual turbo speed produces the turbo target speed according to the second method.

Continuing with FIG. 5, at decision block 517, the ECU 504 determines whether the engine 502 is in power or braking mode. If the engine 502 is in a power mode, then the turbo speed target generated by the first method (i.e., by PID 512) is selected to establish new vane position for the current iteration. On the other had, if the engine 502 is in braking mode, then the turbo speed target generated according to the second method (i.e., by PID 516) is selected. It is noted that the turbo speed target selected at decision block 517 is also referred to as a "selected turbo speed target," in the present application.

Next, the turbo speed target selected at the decision block 517 may be limited to within a desired range of turbo speeds at a limiting block 519, where, if the turbo speed target falls outside the desired range, the turbo speed target can be reset to be within the desired range. The turbo speed target is then compared to the actual turbo speed at a summing node 521 to determine a turbo speed error, or "$err_{speed}$," which is fed into a PID 518. The PID 518 may be configured to determine a new vane position (i.e., $\theta_{new}$) based on $err_{speed}$ and a known PID technique. Alternatively, the PID 518 may determine $\theta_{new}$ by first utilizing a modified PID to calculate a desired change in vane position, i.e. $\Delta^\theta$, according to Equation 5, discussed above and shown below:

$$\Delta^\theta = k_p(err_{speed}) + k_d \cdot d(err_{speed})/dt \qquad \text{Equation 5}$$

wherein "$err_{speed}$" is the error value defined as the difference between the actual turbo speed and the turbo speed target as determined at the summing node 521, and wherein $k_p$ is the proportional gain value and $k_d$ is the differential gain value. Following, $\Delta^\theta$ is summed with the vane position from the preceding iteration to arrive at $\theta_{new}$, which is then inputted into a summing node 523.

In certain aspects of the present embodiment, a feed forward module 520 may be implemented to improve control of the vane position. The feed forward module 520 receives input from sensors on the engine 502 indicating the throttle position and/or fuel rate of the engine 502. The forward module 520 can be configured to generate a feed forward value based on the inputted throttle position or fuel rate, a threshold value ("Y") and a constant value ("$K_a$"). The feed forward value may then be input into the summing node 523 in order to modify $\theta_{new}$ as may be needed. The feed forward value can be calculated according to Equation 2, described above.

Following, a limiting block 525 may be included in the ECU 504 to ensure that $\theta_{new}$ is within a desired range of vane positions. If $\theta_{new}$ does not fall within the desired range, then $\theta_{new}$ may be reset at the limiting block 525 so as to be within the desired range. $\theta_{new}$ is then fed into a D/A converter 522, which converts $\theta_{new}$ into an analog signal for controlling the actuator 506. Based on the signal received from the D/A converter 522, the actuator 506 adjusts the vane position of the VGT 508 to match $\theta_{new}$. In this manner, the vane position of the VGT 508 can be controlled and adjusted.

From the above description of the invention it is manifest that various techniques can be used for implementing the concepts of the present invention without departing from its scope. Moreover, while the invention has been described with specific reference to certain embodiments, a person of ordinary skills in the art would appreciate that changes can be made in form and detail without departing from the spirit and the scope of the invention. The described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method for positioning a variable geometry member in a variable geometry turbocharger coupled to an internal combustible engine, the method comprising steps of:
    determining a boost pressure target for said turbocharger;
    calculating an error value, $err_{boost}$, between said boost pressure target and a measured actual boost pressure;
    determining a first new variable geometry member position for said turbocharger based on said $err_{boost}$;
    determining a second new variable geometry member position for said turbocharger based on a measured speed of the engine; and
    positioning the variable geometry member according to the first new variable geometry member position when the engine is in a power mode, and to the second new variable geometry position when the engine is in braking mode.

2. The method as recited in claim 1 wherein said step of determining said first new variable geometry member position comprises steps of:
    determining a change in variable geometry member position, $\Delta^\theta$, wherein said $\Delta^\theta$ is substantially equal to $k_p(err_{boost}) + k_d \cdot d(err_{boost})/dt$; and
    summing said $\Delta^\theta$ with a preceding variable geometry member position.

3. The method as recited in claim 1 further comprising, prior to the step of calculating said $err_{boost}$, limiting said boost pressure target based on an ambient pressure to prevent overspeeding the turbocharger.

4. The method as recited in claim 1 further comprising, prior to said step of determining said second new variable geometry member position, a step of modifying the first new variable geometry member position with a feed forward value, wherein said feed forward valve is substantially equal to $(|dTP/dt|-Y)*K_a$.

5. A system for positioning a variable geometry member in a turbocharger that is coupled to an internal combustible engine, said system comprising:
    a boost target map for determining a boost pressure target for said turbocharger;
    an engine control unit configured to calculate an error value, $err_{boost}$, between the boost pressure target and an actual measured boost pressure to determine a second new variable geometry member position for the turbocharger based on a measured speed of the engine;

a proportional integral differential module configured to determine a first new variable geometry member position for said turbocharger based on said $err_{boost}$;

an open-loop control module configured to determine a second new variable geometry member position based on engine speed; and an actuator configured to position said variable geometry member according to said first new variable geometry member position when the engine is in a power mode, and according to the second new variable geometry member position when the engine is in a braking mode.

6. The system as recited in claim 5 wherein the proportional integral differential module generates said first new variable geometry member position by determining a change in the variable geometry member position, $\Delta^\theta$ wherein said $\Delta^\theta$ is substantially equal to $k_p(err_{boost})+k_d \cdot d(err_{boost})/dt$, and summing said $\Delta^\theta$ with a preceding variable geometry member position.

7. The system as recited in claim 5 wherein the boost pressure target is limited based on an ambient pressure to prevent overspeeding the turbocharger.

8. The system as recited in claim 5 further comprising a feed forward module configured to generate a feed forward value, FF, wherein said FF is substantially equal to $(|dTP/dt|-Y)*K_a$, and wherein said FF is used to modify said first new variable geometry member position.

9. A method for positioning a variable geometry member in a turbocharger that is coupled to an internal combustible engine, said method comprising steps of:

determining a boost pressure target for said turbocharger;

calculating a first error value, $err_{boost}$, between said boost pressure target and a measured actual boost pressure;

generating a turbo speed target for said turbocharger based on said $err_{boost}$;

calculating a second error value, $err_{speed}$, between said turbo speed target and a measured actual turbo speed of said turbocharger;

determining a new variable geometry member position for said turbocharger based on said $err_{speed}$; and positioning said variable geometry member according to said new variable geometry member position.

10. The method as recited in claim 9 wherein said step of generating said turbo speed target comprises steps of:

determining a change in turbo speed, $\Delta_{speed}$, wherein said $\Delta_{speed}$ is substantially equal to $k_p(err_{boost})+k_d \cdot d(err_{boost})/dt$; and summing said $\Delta_{speed}$ with said actual turbo speed.

11. The method as recited in claim 9 wherein said step of determining said new variable geometry member position comprises steps of:

determining a change in variable geometry member position, $\Delta^\theta$, wherein said $\Delta^\theta$ is substantially equal to $k_p(err_{speed})+k_d \cdot d(err_{speed})/dt$; and summing said $\Delta^\theta$ with a preceding variable geometry member position.

12. The method as recited in claim 9 further comprising a step of modifying said new variable geometry member position with a feed forward value, FF, wherein said FF is substantially equal to $(|dTP/dt|-Y)*K_a$, prior to said step of positioning said variable geometry member.

13. The method as recited in claim 9 further comprising a step of resetting said turbo speed target between a lower and an upper turbo speed threshold prior to said step of calculating said $err_{speed}$.

14. The method as recited in claim 9 further comprising a step of resetting said new variable geometry member position between a minimum and a maximum variable geometry member position prior to said step of positioning said variable geometry member.

15. A system for positioning a variable geometry member disposed within a turbocharger that is coupled to an internal combustible engine, said system comprising:

a boost target map for determining a boost pressure target for said turbocharger;

an engine control unit configured to calculate a first error value, $err_{boost}$, between said boost pressure target and a measured actual boost pressure;

a first proportional integral differential module configured to generate a turbo speed target for said turbocharger based on said $err_{boost}$, said engine control unit being further configured to calculate a second error value, $err_{speed}$, between said turbo speed target and an actual turbo speed of said turbocharger;

a second proportional integral differential module configured to generate a new variable geometry member position for said turbocharger based on said $err_{speed}$; and an actuator configured to position said variable geometry member according to said new variable geometry member position.

16. The system as recited in claim 15 wherein said first proportional integral differential module generates said turbo speed target by determining a change in turbo speed, $\Delta_{speed}$, wherein said $\Delta_{speed}$ is substantially equal to $k_p(err_{boost})+k_d \cdot d(err_{boost})/dt$, and summing said $\Delta_{speed}$ with said actual turbo speed.

17. The system as recited in claim 15 wherein said second proportional integral differential module generates said new variable geometry member position by determining a change in variable geometry member position, $\Delta^\theta$, wherein said $\Delta^\theta$ is substantially equal to $k_p(err_{speed})+k_d \cdot d(err_{speed})/dt$, and summing said $\Delta^\theta$ with a preceding variable geometry member position.

18. The system as recited in claim 15 further comprising a feed forward module configured to generate a feed forward value, FF, wherein said FF is substantially equal to $(|dTP/dt|-Y)*K_a$, and wherein said FF is used to modify said first new variable geometry member position.

19. The system as recited in claim 15 further comprising a limiting module configured to reset said turbo speed target between a lower and an upper turbo speed threshold.

20. The system as recited in claim 15 further comprising a limiting module configured to reset said new variable geometry member position between a minimum and a maximum variable geometry member position.

21. A method for positioning a variable geometry member disposed within a turbocharger that is coupled to an internal combustible engine, said method comprising steps of:

determining a boost pressure target for said turbocharger;

calculating a first error value, $err_{boost}$, between said boost pressure target and a measured actual boost pressure;

generating a first turbo speed target for said turbocharger based on said $err_{boost}$;

determining a turbine pressure target for said turbocharger;

calculating a second error value, $err_{turbine}$, between said turbine pressure target and a measured actual turbine pressure;

generating a second turbo speed target for said turbocharger based on said $err_{turbine}$;

selecting said first turbo speed target when said engine is in a power mode, and selecting said second turbo speed target when said engine is in a braking mode to produce a selected turbo target speed;

calculating a third error value, $err_{speed}$, between said selected turbo speed target and a measured actual turbo speed;

determining a new variable geometry member position for said turbocharger based on said $err_{speed}$; and positioning said variable geometry member according to said new variable geometry member position.

22. The meted as recited in claim 21 wherein said step of generating said first turbo speed target comprises steps of:

determining a change in turbo speed, $\Delta_{speed}$, wherein said $\Delta_{speed}$ is substantially equal to $k_p(err_{boost})+k_d \cdot d(err_{boost})/dt$; and summing said $\Delta_{speed}$ with said actual turbo speed.

23. The method as recited in claim 21 wherein said step of generating said second turbo speed target comprises steps of:

determining a change in turbo speed, $\Delta_{speed}$ wherein said $\Delta_{speed}$ is substantially equal to $k_p(err_{turbine})+k_d \cdot d(err_{turbine})/dt$; and summing said $\Delta_{speed}$ with said actual turbo speed.

24. The method as recited in claim 21 wherein said step of determining said new variable geometry member position comprises steps of:

determining a change in variable geometry member position, $\Delta^\theta$, wherein said $\Delta^\theta$ is substantially equal to $k_p(err_{speed})+k_d \cdot d(err_{speed})/dt$; and summing said $\Delta^\theta$ with a preceding variable geometry member position.

25. The method as recited in claim 21 further comprising a step of modifying said new variable geometry member position with a feed forward value, FF, wherein said FF is substantially equal to $(|dTP/dt|-Y)*K_a$, prior to said step of positioning said variable geometry member.

26. A system for positioning a variable geometry member disposed within a turbocharger that is coupled to an internal combustible engine, said system comprising:

a boost target map for determining a boost pressure target for said turbocharger;

an engine control unit configured to calculate a first error value, $err_{boost}$, between said boost pressure target and a measured actual boost pressure;

a first proportional integral differential module configured to generate a first turbo speed target for said turbocharger based on said $err_{boost}$;

a turbine pressure map for determining a turbine pressure target for said turbocharger, said engine control unit being further configured to calculate a second error value, $err_{turbine}$, between said turbine pressure target and a measured actual turbine pressure;

a second proportional integral differential module configured to generate a second turbo speed target for said turbocharger based on said $err_{turbine}$, said engine control unit being further configured to select said first turbo speed target when said engine is in a power mode, and to select said second turbo speed target when said engine is in a braking mode to produce a selected turbo target speed, and to calculate a third error value, $err_{speed}$, between said selected turbo speed target and an actual turbo speed;

a third proportional integral differential module configured to determine a new variable geometry member position for said turbocharger based on said $err_{speed}$; and an actuator configured to position the variable geometry member of said turbocharger according to said new variable geometry member position.

27. The system as recited in claim 26 wherein said first proportional integral differential module generates said first turbo speed target by determining a change in turbo speed, $\Delta_{speed}$, wherein said $\Delta_{speed}$ is substantially equal to $k_p(err_{turbine})+k_d \cdot d(err_{turbine})/dt$, and summing said $\Delta_{speed}$ with said actual turbo speed.

28. The system as recited in claim 26 wherein said second proportional integral differential module generates said second turbo speed target by determining a change in turbo speed, $\Delta_{speed}$, wherein said $\Delta_{speed}$ is substantially equal to $k_p(err_{turbine})+k_d \cdot d(err_{turbine})/dt$, and summing said $\Delta_{speed}$ with said actual turbo speed.

29. The system as recited in claim 26 wherein said third proportional integral differential module determines said new variable geometry member position by determining a change in variable geometry member position, $\Delta^\theta$, wherein said $\Delta^\theta$ is substantially equal to $k_p(err_{speed})+k_d \cdot d(err_{speed})/dt$, and summing said $\Delta^\theta$ with a preceding variable geometry member position.

30. The system as recited in claim 26 further comprising a feed forward module configured to generate a feed forward value, FF, wherein said FF is substantially equal to $(|dTP/dt|-Y)*K_a$, and wherein said FF is used to modify said first new vane position.

* * * * *